INVENTORS
ELMER R. BERNSON
HANS W. ENGEL

ATTORNEYS

INVENTORS
ELMER R. BERNSON
HANS W. ENGEL
ATTORNEYS

United States Patent Office 3,396,534
Patented Aug. 13, 1968

3,396,534
AIR IMPINGEMENT NOZZLE ARRANGEMENT FOR A TURBOCHARGER COMPRESSOR AND AN IMPROVED METHOD OF EMPLOYING AIR IMPINGEMENT
Elmer R. Bernson, Washington, and Hans W. Engel, Peoria, Ill., assignors to Caterpillar Tractor Co., Peoria, Ill., a corporation of California
Filed Apr. 20, 1967, Ser. No. 632,353
9 Claims. (Cl. 60—13)

ABSTRACT OF THE DISCLOSURE

A turbocharger rotor housing having a generally cylindrical rotor chamber with a bladed rotor therein, the rotor housing having a plurality of air impingement nozzles about the periphery of the rotor chamber for directing air onto the blades of the rotor wherein each nozzle is in communication with the rotor chamber at a location along one of a preselected number of radii emanating normally from the axis of the rotor and dividing the rotor chamber into equal sectors, the preselected number of radii being a prime number with respect to orders of vibration representative of the natural frequency of vibration of the rotor blades and a preselected rotational speed range of the rotor during which range air passes through the nozzles to impinge the rotor blades.

Related references

Patent application Ser. No. 537,987, filed Mar. 28, 1966 now Patent No. 3,363,412, in the name of Robert D. Fischer et al. and assigned to the assignee of the present invention.

Background of the invention

The present invention relates generally to an improved housing having a rotor disposed for rotation therein and interacting with varying pressures of a gas which exist periodically about the housing interior during operation of the rotor. More particularly, it relates to a turbocharging compressor for delivering air to an engine where the compressor has a bladed rotor and impingement nozzles in the compressor housing through which nozzles compressed air passes to act against the rotor blades as a jet assist for achieving fast acceleration of the engine and wherein the nozzles are disposed about the housing at preselected locations to prevent resonant vibration conditions from occurring in the rotor.

The use of impingement nozzles is well known in the prior art. However, when air is introduced under pressure through a plurality of ports in a rotor housing to interact with the rotor, the characteristics of the rotor must be carefully matched with the rotor housing to maintain vibration of the rotor within safe limits. The problem is particularly severe in a rotor having radially extending blades which interact with air in the housing. The blades of such a rotor have a natural frequency of vibration which may be defined in cycles per second. Air which enters the rotor chamber through a plurality of ports in the housing causes high pressure regions to periodically exist around the rotor chamber and act upon the blades according to the location of the ports. Since there is an interaction between the blades and the high pressure regions existing at periodic intervals around the rotor chamber, harmonic forces may be produced which coincide with the natural frequency of the blade vibration to cause an undesirable resonant condition within the rotor and particularly in the rotor blades.

A common solution to eliminate such a resonant vibration condition has been to clip or cut off a portion of the rotor blades to change their natural frequency of vibration so that the environment of the blades will not set up the resonant condition. However, this approach is not generally effective where the rotor has a wide range of rotational speeds since a new resonant condition may readily occur at a different rotational speed. Another solution has been to reorient the ports in the housing through which air enters to impinge the rotor. However, such attempts have been on a trial and error basis of random distribution which is time consuming and expensive and which is also complicated by a wide rotational speed range.

Summary of the invention

The present invention provides an improved rotor housing of a type having a plurality of ports where gas passing through the ports also interacts with a rotor disposed for rotation in the housing wherein the ports are positioned at preselected points to prevent resonant vibration conditions in the rotor for its entire rotational speed range during which the gas passing through the plurality of ports also interacts with the rotor. Such a rotor has a natural frequency of vibration and various orders of vibration established by its natural frequency of vibration and its range of rotational speeds within the rotor chamber. The improvement provided by the present invention comprises each of the ports being disposed at a location along one of a preselected number of radii, the radii emanating normally from the axis of the cylindrical rotor chamber and dividing the chamber into equal sectors, said preselected number of radii being a prime number with respect to the numerical values of the orders of vibration representative of the natural frequency of vibration of the rotor and the rotational speed range within which the rotor is to rotate while the gas is interacting therewith.

The invention also provides a method of air impingement comprising the step of directing impingement gas streams to impinge the rotor blades at least partially other than when the blades are in a forward vibrational mode according to their natural frequency of vibration.

Description of a preferred embodiment

Figure 1:
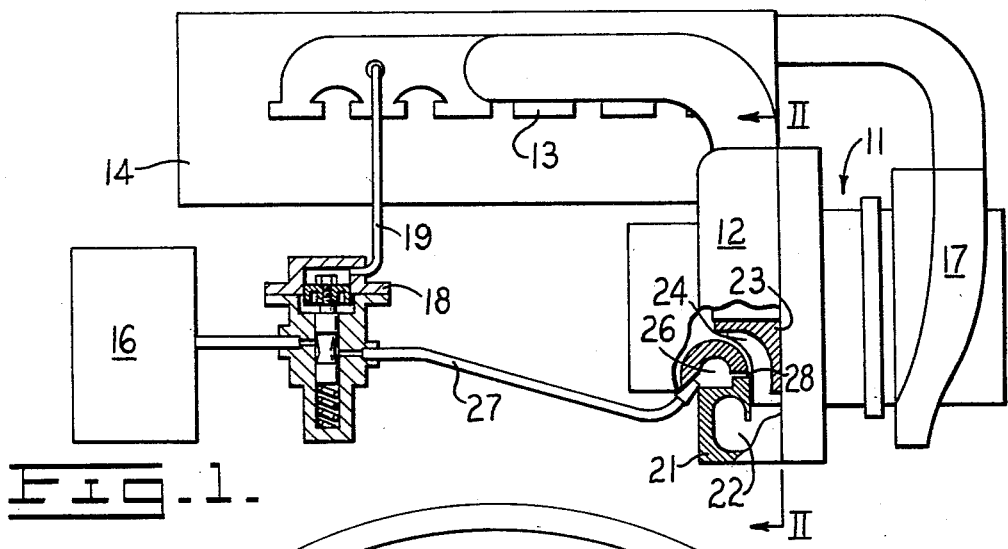
FIG. 1 is a schematic representation of an industrial air compressor having a prime mover, a turbocharging compressor (partially in section) to supply air to the prime mover and a control for delivering compressed air into the rotor chamber of the turbocharging compressor.

Although the present invention is described below with particular reference to an air compressor system such as is illustrated in FIG. 1, the invention relates generally to any turbine having a rotor interacting with a gas passing through a plurality of ports in the rotor housing.

Referring now to FIG. 1, a turbocharger 11 of the air compressor system includes a compressor 12 which delivers air to a manifold 13 of an engine 14 and is driven by a turbine 17 which in turn is driven by exhaust from the engine. The compressor 12 is connected to an independent source of air pressure 16, for example, the receiver of the air compressor system, through a regulating valve 18. The regulating valve 18 operates in response to and as a function of the pressure in the engine manifold 13 which is communicated to the regulating valve by a connecting line 19. When the pressure in the manifold 13 drops below a predetermined pressure, the valve 18 communicates the air pressure source 16 with the compressor whereby the turbocharger is assisted in supplying air to the engine manifold 13 making it possible for the turbocharger to provide an increased supply of air to the engine manifold relative to the amount of air normally provided by the turbocharger when the engine, and accordingly the turbocharger driven by the exhaust of the engine, is operating at a low speed. The regulated air supply not only is added to the mass of air supplied to the engine, but also accelerates the turbocharger and thereby increases the mass or air entering the turbocharger intake and being forced into the engine manifold. This operation is generally referred to as a jet assist to provide for fast acceleration of the engine and to eliminate or minimize the common problem of turbocharger lag. Thus, the regulating valve 18 is adjusted to provide air pressure to act as a jet assist in the turbocharger compressor over a preselected turbocharger speed range wherein it is desirable to increase the rate of acceleration of the engine.

Figure 2:
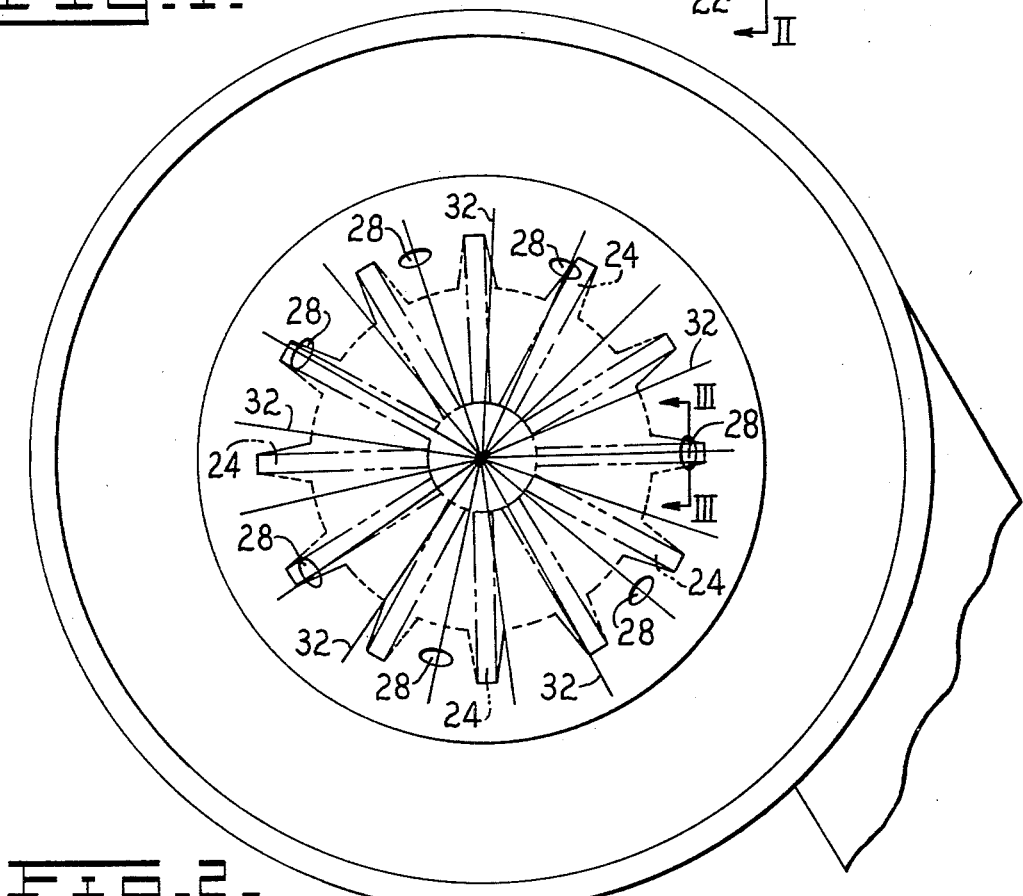
FIG. 2 is a sectional view of the rotor and the rotor chamber of the turbocharging compressor of FIG. 1.

Referring now to the sectioned portion of the turbocharger compressor 12 in FIG. 1 and also to FIG. 2, the compressor housing indicated at 21 internally defines a generally cylindrical rotor chamber 22 and has a rotor 23 with a plurality of radially extending blades, indicated at 24, disposed for rotation therein. The compressor housing defines an enclosed air passage 26 which is generally annular and which is disposed adjacent to the outer periphery of the radially extending blades of the rotor. The annular air passage of the compressor housing is communicated with the regulating valve 18 by means of a conduit 27. To permit compressed air from the annular air passage 26 to enter the rotor chamber and act against the blades of the rotor, a plurality of ports or nozzles, indicated at 28, are defined by the compressor housing between the annular air passages 26 and the rotor chamber 22.

The air compressor system described above is typical of the prior art as is evidenced by above-noted patent application Ser. No. 537,987 which generally describes a similar air compressor system and describes in detail a regulating valve such as is indicated at 18 in FIG. 1.

The present invention provides an improvement in rotor housings such as the compressor housing 21 of FIG. 1 wherein the plurality of nozzles 28 are positioned about the periphery of the rotor according to a plan of preselection which avoids resonant conditions in the rotor blades and which reduces the time and expense involved in the construction of such a housing. Further, the positioning of the ports according to the preselected plan does not involve alteration of the compressor components such as the rotor blades, and accordingly optimum machining tolerances may be maintained between the rotor and the housing.

As the rotor is rotating in the housing at a given speed and its blades are vibrating at the natural frequency, there will be a particular number of blade vibrations during each revolution of the rotor. The condition where the rotational speed is an even multiple of the natural frequency of vibration of the blades, and accordingly where the number of blade vibrations per rotor revolution is an integer, is termed an order of vibration. Since the rotor will rotate over a given speed range, it may experience numerous conditions having different orders of vibration. For example, if the blades have a natural frequency of vibration of 7,000 cycles per second, its twelfth order of vibration would occur at 35,000 r.p.m., its eleventh order of vibration at 38,200 r.p.m. and its tenth order of vibration at 42,000 r.p.m. Thus it may be seen that a resonant condition of blade vibration will occur when the pressure variations in the rotor chamber are distributed about the rotor in equal sectors corresponding to the order of vibration being experienced by the rotor and its blades.

Figure 4:
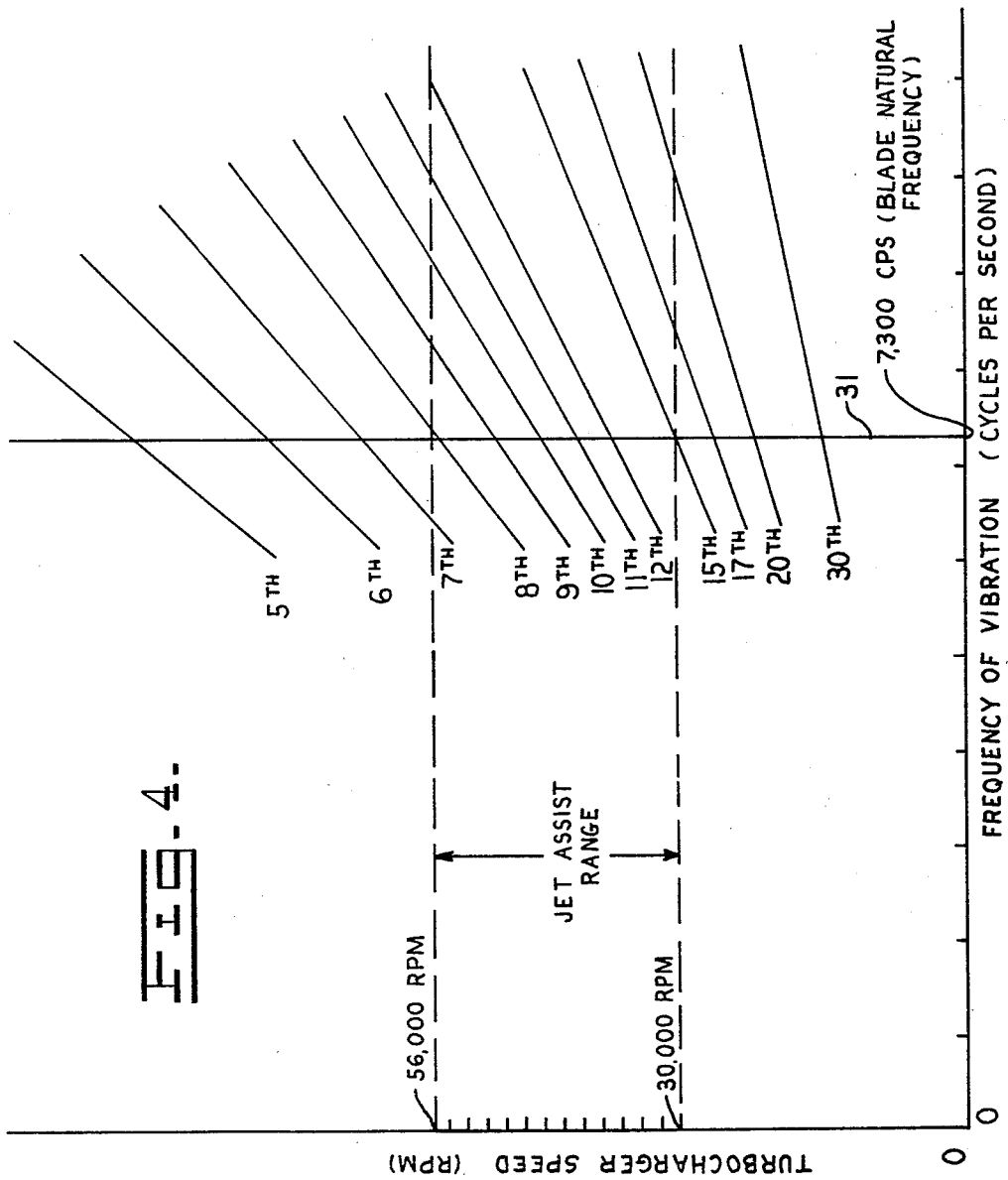
FIG. 4 is a graphical representation illustrating the orders of vibration for a rotor which has a given natural frequency of vibration and a given range of rotational speed during which air enters the nozzles to interact with the rotor blades.

Referring now to FIGS. 2 and 4, for purposes of a particular example of the present invention, the turbocharger 11 and the compressor 12 which is a part thereof (as shown in FIG. 1), have an operating speed of up to approximately 70,000 r.p.m. To achieve desired engine acceleration and to overcome the effect of turbocharger lag, the regulating valve 18 is adjusted to provide compressed air to the compressor housing through the conduit 27 over the turbocharger speed range of 30,000 to 56,000 r.p.m. Further, the blades 24 of the compressor rotor 23 have a natural frequency of vibration of 7,300 cycles per second (c.p.s.) as indicated by the vertical line indicated at 31 in FIG. 4. The varying diagonal lines, all of which include the origin of the graph of FIG. 4 and which are indicated at 5th, 6th, 7th, etc., represent orders of vibration for the rotor blades and their intersections with the vertical lines 31 represent turbocharger speeds at which the number of vibrational cycles of the blade during each complete revolution of the rotor is an integer. Further, it may be seen that the 8th through the 15th orders of vibration for the rotor 23 are experienced by the blades during the jet assist range of turbocharger speeds, that is 30,000 to 56,000 r.p.m.

Referring to FIG. 2, when air pressure passes through each of the ports 28 into the rotor chamber to impinge the rotor blades 24, high pressure regions exist periodically about the periphery of the rotor chamber, each high pressure region being adjacent to one of the nozzles 28 which are spaced about the periphery of the rotor in uniform distribution. Thus, the rotor blades rotating within the rotor chamber 22, of FIG. 1, will be periodically impinged by the air jets entering the nozzles 28 which create the above noted high pressure regions.

Each vibrational cycle of the rotor blades includes a forward and a rearward vibrational oscillation of each blade. It may readily be observed that if each blade is in the forward oscillation of its vibrational cycle when it is impinged by an air jet from one of the nozzles 28 its amplitude of vibration will correspondingly be periodically increased by the air jets. If the blade is in its forward oscillation mode as it passes each of a sequential plurality of the nozzles 28, a resonance condition exists at which the increasing vibrational amplitude of the blades may readily cause rotor failure. On the other hand, if the rotor blades are in their rearward mode of vibrational oscillation when they are impinged by an air stream from at least some of the nozzles 28, the amplitude of the blade vibrations will be periodically decreased or at least maintained at a substantially constant level to provide a safe rotor operating condition.

Based on the above discussion, if the nozzles 28 are evenly spaced about the rotor and their number corresponds to one of the orders of vibration within the jet assist range, a resonant condition such as is discussed above will occur at some rotational speed within that speed range. To avoid such a resonant condition according to the present invention, each of the nozzles is disposed at a location along one of a preselected number of radii which emanate normally from the rotor axis and divide the rotor chamber into equal sectors. The preselected number of radii, which are indicated at 32 in FIG. 2, is determined as a prime number with respect to the orders of vibration included within the jet assist range whereby the preselected number of radii is neither evenly divisible by, nor evenly divisible into any of the orders of vibration included within that jet assist range. Referring again particularly to FIG. 4, since the 8th through the 15th orders of vibration are included within the jet assist range, any number below those orders of vibration, that is the numeral 7 or lower, would be evenly divisible into one of the orders of vibration within the jet assist range. The number 16 is evenly divisible by the 8th order of vibration which is included within the range and therefore it cannot be a prime number as described above. The numeral 17 is a suitable prime number and accordingly 17 radii are selected to divide the rotor chamber 22 into 17 equal sectors.

A nozzle could be located at each of the 17 radii with assurance that the rotor blades could not always be in a forward oscillating mode when rotating past each of the nozzles. However, additional considerations affect the selection of the total number of nozzles according to the following description and even though a lesser number of nozzles is selected, the fact that each is positioned along one of the radii will insure against the establishment of an undesirable resonant condition. As to the conditions limiting the number of the nozzles, machining capabilities effectively limit the minimum cross-sectional area of the air flow passage through each of the nozzles. On the other hand, since the amount and rate of flow of air pressure into the annular air passage 26 is limited, the total cross-sectional area of all of the nozzles taken together must be maintained under a maximum value to insure the optimum effect of the air jets passing therethrough and against the rotor blades. Accordingly, seven nozzles were selected to provide a cross-sectional area of each nozzle which may be readily machined while providing an optimum air jet to act against the rotor blades. Thus, as is shown in FIG. 2, each of seven nozzles 28 is disposed around the periphery of the rotor with each of the nozzles located along one of the seventeen radii.

Figure 3:
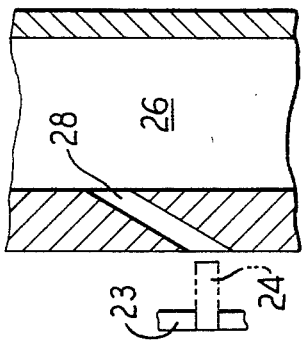
FIG. 3 is a sectioned view taken from FIG. 2 and illustrates in detail one of the nozzles by which compressed air is introduced into the rotor chamber.

To achieve the maximum effect of each air stream against the blades, it would be desirable to have the nozzles located to direct the air stream normally against the surface of the blades. However, referring to FIG. 3, with the nozzles penetrating the compressor housing, the optimum achievable effect of an air jet passing through each nozzle will be realized if the nozzle is maintained within an angular range of 15–30° with an adjacent portion of the interior surface of the housing as indicated at 33.

It may be noted that the theoretically optimum nozzle arrangement would be an infinite number of nozzles having infinitely small air passages therethrough distributed around the entire periphery of the rotor to maintain a substantially uniform air pressure throughout the rotor chamber and thus eliminate possible resonant conditions. However, because of the above limitations, particularly the minimum diameter of a nozzle which can be drilled in the rotor housing, such a theoretically optimum arrangement is not feasible and the present invention provides a solution which is effective to avoid the problem of resonant conditions.

From the above description, it is to be noted that the present invention also teaches an improved method of employing air impingement with relation to a rotating rotor according to a plan of preselection which avoids the necessity of altering the rotor to prevent resonant vibrational conditions arising in the rotor blades. In such a method, impingement gas or air streams are intermittently impinged forwardly upon each of the blades of the rotor with the location at which each gas stream impinges the rotor blades rotating therepast and the time at which each blade passes one of the locations whereat it is impinged by one of the gas streams suitably synchronized with the natural frequency of vibration of the rotor blades according to the description above.

Although the present invention has been described with particular reference to a single embodiment, it is to be noted that numerous variations and modifications are possible within the scope of the present invention. For example, in the air compressor system of FIG. 1, air is introduced through a plurality of ports 28 into the rotor chamber to interact with the rotor blades. However, the invention is equally applicable in a rotor assembly where air is to interact with the rotor blades and subsequently exit the rotor chamber through a plurality of similar ports within the rotor housing. In such a configuration increasing air pressure regions would be caused by the rotor blades while a pressure decrease would be occurring near each outlet port. Thus there would be a similar periodically existing pattern of high pressure regions around the rotor chamber and the disposition of the outlet ports in a similar manner as was discussed above would equally serve to prevent resonant conditions.

Further, as the speed range wherein the air streams are to interact with the blades includes a greater number of orders of vibration, it may be seen that ports having a substantial cross-sectional area may each overlap one of a varying number of radii which evenly divide the rotor chamber. Thus, if a very large prime number must be selected, the size of the nozzles must be carefully controlled to prevent the above mentioned possible result. A solution to prevent the ports from overlapping more than one of various preselected numbers of radii would be to provide each nozzle as a slot oriented along one of the radii and thus minimize the possibility of such an overlapping effect.

What is claimed is:

1. An improvement in turbines of the type having a housing defining a generally cylindrical rotor chamber and a power transmitting rotor disposable for rotation therein at varying speeds of rotation, the housing having a plurality of ports therethrough which communicate a gas passage external of the housing with the rotor chamber whereby gas which passes through the ports also interacts with the rotor at least during a selected rotational speed range of the rotor, the rotor having a natural frequency of vibration and various orders of vibration established by its natural frequency of vibration and its range of rotational speeds within the rotor chamber, the improvement comprising each of the ports being disposed in communication with the rotor chamber at a location along one of a preselected number of radii, said radii emanating normally from the axis of the cylindrical chamber and dividing the housing into equal sectors, said preselected number of radii being a prime number with respect to the numerical values of the orders of vibration representative of the natural frequency of vibration of the rotor and the rotational speed range within which the rotor is to rotate while the gas in interacting therewith.

2. The improved turbine of claim 1 where the turbine is of a type in which the gas is to enter the rotor chamber through the ports from the gas passage external of the housing and impinges blades of the rotor, the impinging gas to serve as at least a portion of a driving force to be exerted on the rotor.

3. An improved turbocharging compressor for the engine of an industrial air compressor where the turbocharging compressor comprises a housing having a generally cylindrical rotor chamber, a rotor having radially extending blades and disposed for rotation in the rotor chamber to rotate at varying speeds and force air to flow from an inlet of the housing through an outlet of the housing in communication with the engine and an air passage defined at least partly by the housing to be external of the rotor chamber, the rotor having a natural frequency of vibration and various orders of vibration established by its natural frequency of vibration and its range of rotational speeds within the rotor chamber, the housing having a plurality of impingement nozzles in communication with the air passage and the rotor chamber to direct pressurized air selectively provided in the air passage to impinge the rotor at least over a preselected range of the rotor speed to act as a jet assist for increasing the motor speed and increasing the flow of air from the housing inlet to the engine, the improvement comprising:

each of the nozzles being in communication with the rotor chamber along one of a preselected number of radii, said radii emanating normally from the rotor axis and dividing the rotor chamber of the housing into equal sectors, said preselected number of radii being a prime number with respect to the numerical values of the orders of vibration representative of the natural frequency of vibration of the rotor and the preselected rotational speed range of the rotor within which range pressurized air from the external air passage is directed against the rotor blades by the nozzles.

4. The improved turbocharging compressor of claim 3 wherein said preselected number of radii is larger than and evenly indivisible by any of the numerical values of the orders of vibration representative of the rotor speeds at which the jet assist is to b employed.

5. The improved turbocharging compressor of claim 3 wherein said nozzles are disposed in a wall of the rotor chamber to be generally adjacent the outer ends of the radially extending rotor blades.

6. The improved turbocharging compressor of claim 5 wherein each nozzle has a pressurized air conduit which approaches the rotor chamber generally in a direction corresponding to the rotational direction of the rotor and which forms an angle with an adjacent portion of an interior surface of the rotor chamber wall in the general range of 15–30°.

7. The improved turbocharging compressor of claim 3 wherein each nozzle has an effective internal cross-sectional area for passage of pressurized air therethrough, the number and the total effective cross-sectional area of the nozzles being preselected for proper control of the pressurized air passing therethrough and impinging the rotor blades.

8. An improved process of air impingement where a plurality of gas streams are forwardly impinged upon blades of a rotating rotor to accelerate the rotational speed of the rotor without causing resonant vibrational conditions in the rotor, the rotor blades having a natural frequency of vibration which causes the blades to oscillate in a sequential series of forward and rearward vibrational modes during rotation of the rotor, and comprising the step of:

directing the impingement gas streams according to a plan of preselection to intermittently impinge each of the blades at least partially other than when the blades are in the forward vibrational modes according to their natural frequency of vibration.

9. The process of claim 8 wherein the step of directing the impingement gas streams to intermittently impinge each of the blades of the rotor is according to a preselected plan of suitably synchronizing locations at which each gas stream impinges the rotor blades rotating therepast and the time at which each blade passes one of the locations whereat it is impinged by one of the gas streams with the natural frequency of vibration of the rotor blades, each location disposed along one of a preselected number of radii, said radii emanating normally from the axis of the rotor and forming equal sectors, said preselected number of radii being a prime number with respect to the numerical values of orders of vibration representative of the natural frequency of vibration of the rotor and a rotational speed range within which the rotor is to rotate while the gas is interacting therewith.

References Cited
UNITED STATES PATENTS

| | | | |
|---|---|---|---|
| 1,525,814 | 2/1925 | Lasche | 253—39 |
| 3,190,068 | 6/1965 | Williams | 60—13 |

MARTIN P. SCHWADRON, *Primary Examiner.*

DOUGLAS HART, *Assistant Examiner.*